United States Patent
Tsukada

[11] 3,834,803
[45] Sept. 10, 1974

[54] PHOTO-INFORMATION TRANSMISSION AND EXPOSURE DEVICE
[75] Inventor: Syusei Tsukada, Tokyo, Japan
[73] Assignee: Canon Kabushiki Kaisha, Tokyo, Japan
[22] Filed: Apr. 2, 1973
[21] Appl. No.: 346,922

[52] U.S. Cl. .................................. 355/1, 355/47
[51] Int. Cl. ........................................... G03b 27/10
[58] Field of Search .................... 355/1, 47; 95/115

[56] References Cited
UNITED STATES PATENTS
2,939,362   6/1960   Cole ...................... 355/47
3,142,235   7/1964   Siegmund ............... 95/115
3,424,525   1/1969   Towers ................... 355/48

Primary Examiner—John M. Horan
Attorney, Agent, or Firm—Fitzpatrick, Cella, Harper & Scinto

[57] ABSTRACT

A photo-information transmission and exposure device applicable to various types of electrophotographic copying apparatus using a photosensitive medium comprises a photo-information source, an optical fiber plate or bundle secured to the photo-information source, and a movable intermediate optical fiber plate or bundle disposed so as to transmit the photo-information passed from the photo-information source through the fixed optical fiber plate or bundle to the surface of the photosensitive medium to expose that surface to the photo-information. The intermediate optical fiber plate or bundle has its photo-information inlet and outlet faces opposed to the photo-information outlet face of the fixed optical fiber plate or bundle and the surface of the photosensitive medium, respectively.

18 Claims, 8 Drawing Figures

PHOTO-INFORMATION TRANSMISSION AND EXPOSURE DEVICE

BACKGROUND OF THE INVENTION

1. Field of the Invention

This invention generally relates to a photo-information transmission and exposure device. More particularly, it relates to an improved photo-information transmission and exposure device which is applicable to the photo-information exposure station in any of the heretofore proposed or practised electrophotographic copying apparatuses of various types to transmit photo-information through photo-transmission members to thereby ensure the surface of a photosensitive medium to be exposed to the photo-information with a uniform brightness and uniform definition.

2. Description of the Prior Art

Applicant has previously proposed an improved electrophotographic method. This electrophotographic method has employed a photosensitive medium basically comprising an insulative layer, a photoconductive layer and a conductive back-up member, and involved the steps of precharging the insulative layer of the photosensitive medium with the positive or the negative polarity in accordance with the N- or P- type photoconductivity of the photoconductive layer by means of an electrode, a corona discharger or a liquid discharging or charging device to thereby provide charges of the polarity opposite to that of the charges in the surface of the insulative layer in the vicinity of the interface between the photoconductive layer and the insulative layer; thereafter applying any desired voltage to an amount of liquid and contacting such liquid with the surface of the charged insulative layer, said liquid being preset to satisfy the relation that $\phi \leq t/C_i \cdot d$, where $\phi$ is the resistivity of the liquid, $C_i$ the electrostatic capacity of the insulative layer, $d$ the thickness of the liquid layer and $t$ the discharging or charging time, and simultaneously therewith or just therebefore, exposing the photosensitive medium to an original image to thereby change the charged condition of the photosensitive medium in accordance with the bright-and-dark pattern of the original image; subsequently removing the discharging or charging liquid; and thereafter exposing the entire surface of the insulative layer to light to thereby liberate the charges in the vicinity of the interface between the photoconductive layer and the insulative layer which correspond to the dark regions of the original image, thereby forming on the surface of the photosensitive medium an electrostatic latent image of high contrast corresponding to the original image. The method has further included the steps of visualizing the electrostatic latent image with a developer consisting chiefly of charged colorant particles by the use of a liquid or dry type developing process; thereafter transferring the visualized image to paper or similar transfer medium by utilizing an internal or external electric field then heating and fixing the transferred image with the aid of an infrared ray lamp or the like to provide an electrophotographic copy image; and subsequently cleaning the surface of the insulative layer to remove any residual charged particles therefrom to permit the photosensitive medium to be used for another copy cycle. Where the photosensitive medium employed consists of three layers, i.e., an insulative layer, a photoconductive layer and an insulative layer or further includes a conductive layer, the discharging or charging liquid used during the exposure to the image light occurring simultaneously with or immediately before said discharging or charging is preset so as to satisfy the relation that $\phi \leq t(C_1+C_2)/C_1 \cdot C_2 \cdot d$, where $\phi$ is the resistivity of the liquid, $C_1$ and $C_2$ are the electrostatic capacities of the two insulative layers, $d$ is the thickness of the liquid layer, and $t$ is the discharging or charging time, and such liquid is used with any desired potential applied thereto. This is followed by subsequent steps similar to those described with respect to the aforesaid electrophotographic method.

Applicant has also proposed an electrophotographic method which has employed photosensitive medium basically comprising an insulative layer, a photoconductive layer and a conductive back-up member and involved the steps of uniformly charging the surface of the photosensitive medium with the positive or the negative polarity; subsequently discharging the surface of the insulative layer with the aid of a discharging electrode having electrical concavo-convexities and simultaneously therewith, exposing that surface to original image light; and then, if required, exposing the entire surface of the insulative layer uniformly to light, thereby forming on the surface of the photosensitive medium an electrostatic latent image of high contrast corresponding to the original image; and further steps similar to those in the above-described electrophotographic method.

In an electrophotographic copying apparatus for carrying out the described methods, the exposure of the photosensitive surface to the photo-information, especially that from a photo-information source such as a cathode ray tube or a microfilm projector, must be accomplished by causing the photo-information to be transmitted through a photo-transmission member disposed between the photosensitive surface and the photo-information display surface. In the past, a single optical fiber plate has been disposed and used as the photo-transmission member between the photosensitive surface and the photo-information display surface. Such a single fiber plate has generally been used in such a fashion that one face thereof is secured to the fluorescent face of the cathode ray tube or to the projection screen for the microfilm while the other face of the fiber plate is closely spaced apart from the photosensitive surface. For the purpose of illustration, the case of a cathode ray tube will be taken as an example. If the surface of the photosensitive medium was not uniformly smooth but undulatory, the distance between the photo-information outlet face of the fixed cathode ray tube and the surface of the photosensitive medium could more or less be varied during the operation of the photosensitive medium, which would result in a considerably reduction in the definition, brightness and clearness of the image light imparted to the surface of the photosensitive medium. This is because the transmission of photo-information through optical fiber provides a maximum definition, brightness and clearness in the photo-information outlet face and these factors are variable to decrease with the distance from such face due to the dispersion of light. A solution to this problem would be achieved by designing the surface of the photosensitive medium without any undulation but with an ideally high accuracy of surface smoothness, whereas this would be extremely difficult to realize inasmuch as minute care must be taken in finishing the photosensitive surface. If the ideal surface smoothness could be attained at all, it would be extremely difficult or impracticable to provide a uniform or constant distance between the surface of the photosensitive medium and the photo-information outlet face of the optical fiber with the aid of the mechanical accuracy alone. For this reason, it has been the practice either to employ a spring member for supporting and normally biasing an entire optical fiber tube against the surface of the photosensitive medium or to support the entire photosensitive medium in such a manner that it is urged toward the optical fiber tube while keeping a certain degree of freedom for the photosensitive medium to move back and forth. These systems are effective for low copying speeds of the photosensitive medium but, for higher copying speeds, the optical fiber tube suffers from so great an inertia of its free movement due to the position of the surface of the photosensitive medium that it is difficult for the optical fiber tube to follow the changing position of the photosensitive surface resulting from the unsmoothness or undulation of such surface so as to maintain a constant distance between the optical fiber tube and the photosensitive medium.

SUMMARY OF THE INVENTION

It is therefore a primary object of the present invention to provide an improved photo-information transmission and exposure device which eliminates all the drawbacks peculiar to the prior art and in which a photosensitive medium and a cathode ray tube are set in fixed positions any yet, uniformly bright and clear photo-information can be supplied from the cathode ray tube to the surface of the photosensitive medium.

It is another object of the present invention to provide an improved photo-information transmission and exposure device in which an optical fiber tube comprises an optical fiber bundle secured to the cathode ray tube and adjust means is provided to ensure the surface of the photosensitive medium to be exposed to the photo-information from the optical fiber tube keeping a substantially intimate contact with the surface of the photosensitive medium.

It is still another object of the present invention to provide an improved photo-information transmission and exposure device in which the optical fiber tube and the photosensitive medium are disposed so that the angle formed between the photo-information outlet face of the former and the surface of the latter (if they are curved surfaces, between the average tangential lines thereon) is any angle within 180° and in which a movable intermediate optical fiber bundle having photo-information inlet and outlet faces adapted for intimate contact with corresponding surfaces is provided between the optical fiber tube and the photosensitive medium in such a manner that it is slidable and adjustable in accordance with the variation in the distance between the optical fiber tube and the photosensitive medium so as to ensure the surface of the medium to be exposed to the photo-information from the optical fiber tube keeping a substantially intimate contact with the surface of the photosensitive medium.

It is yet another object of the present invention to provide an improved photo-information transmission and exposure device in which an amount of transparent lubricant liquid is provided between the fixed optical fiber bundle and the movable intermediate optical fiber bundle to ensure smooth wedging movement of the movable intermediate optical fiber bundles.

These and other objects and features of the present invention will be better understood from the following detailed description of various embodiments taken in conjunction with the accompanying drawings.

DESCRIPTION OF THE PREFERRED EMBODIMENTS

Figure 1A:
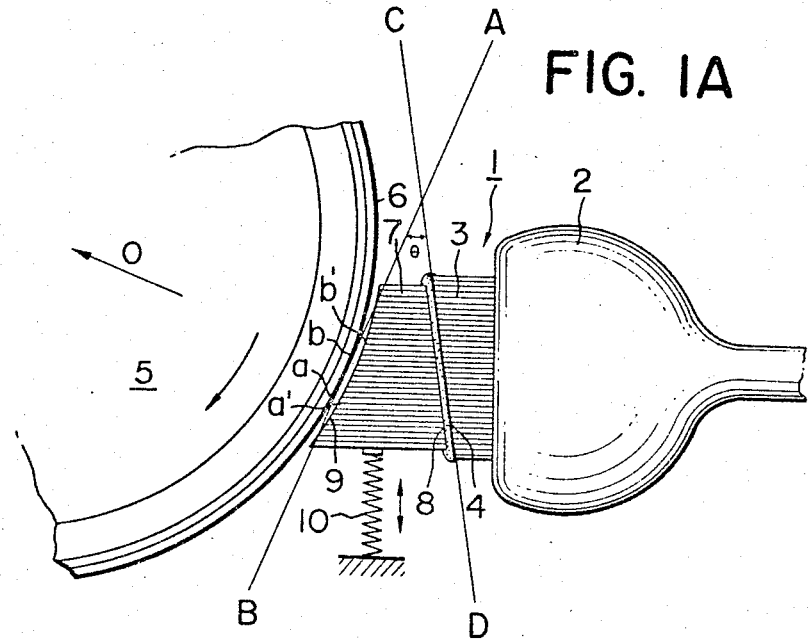
FIG. 1(A) is a cross-sectional view showing a basic construction of the photo-information transmission and exposure device of the present invention.

The basic construction of the present invention will hereinafter be described in detail with reference to FIGS. 1(A) and (B). Numeral 1 generally designates an optical fiber tube comprising an optical fiber plate 3 secured to the fluorescent face of a cathode ray tube 2. In a substantially V-shaped gap provided between the photo-information outlet face 4 of the optical fiber tube and the surface 6 of a photosensitive medium 5, there is disposed a movable intermediate optical fiber plate 7. The phto-information inlet face 8 and outlet face 9 of the intermediate optical fiber plate 7 may be flat or curved so as to be in uniform contact with or closely spaced apart from the photo-information outlet face 4 of the optical fiber tube 3 and the surface 6 of the photosensitive medium 5, respectively. More specifically, where the photosensitive medium is in the form of a drum, the photo-information outlet face of the intermediate optical fiber plate is curved concentrically with the periphery of the photosensitive medium. The intermediate optical fiber plate is generally constructed such that it can be substantially wedged into the gap between the photo-information outlet face of the optical fiber tube and the surface of the photosensitive medium and that it is movable in the direction of arrow A when the gap is wider and movable in the direction of arrow B when the gap is narrower, thereby maintaining a constant and uniform contact or closely spaced-apart relationship between the surface of the photosensitive medium and the photo-information outlet face of the intermediate optical fiber plate and between the photo-information outlet face of the optical fiber tube and the photo-information inlet face of the intermediate optical fiber plate. This may be accomplished by using a spring 10 or like means adapted to normally bias the intermediate fiber plate. The described construction ensures the photo-information from the optical fiber tube to be applied to the surface of the photosensitive medium with a maximum degree of definition.

In the described construction wherein the intermediate fiber plate is interposed between the optical fiber tube 1 and the photosensitive medium 5, it is now assumed that the photosensitive medium is displaced in the direction of arrow 0 due to any unsmooth or undulatory contour of the surface of the photosensitive medium or to any eccentricity of the drum-shaped photosensitive medium. It is also assumed that, before such displacement occurs, the points $a$ and $b$ on the surface of the photosensitive medium have corresponded to the points $a'$ and $b'$ on the intermediate optical fiber plate, respectively. After the displacement, there will be provided a clearance between the photosensitive medium and the intermediate optical fiber plate, whereby the latter may be raised upwardly by the spring 10 until the clearance between the photosensitive medium and the intermediate fiber plate becomes equal to that before the displacement of the photosensitive medium has occurred. Thus, the points $a'$ and $b$ now correspond to each other. Conversely, when the eccentricity of the photosensitive medium takes place in the direction opposite to that of arrow 0, the rotative force of the photosensitive medium takes place in the direction opposite to that of arrow 0, the rotative force of the photosensitive medium will act upon the intermediate fiber plate to urge it downwardly. In this way, the displacement of the photosensitive medium relative to the optical fiber tube may be absorbed into the movement of the intermediate optical fiber plate. The shape of the intermediate fiber plate may preferably be rectangular parallelopiped from the optical point of view, but more preferably it should be wedge-shaped in order to accomplish the above-described movement.

In FIGS. 1(A) and (B), the angle $\theta$ between the average tangential line A–B on the curved surface of the photosensitive drum and the line C–D provided by the photo-information outlet face of the optical fiber tube is shown to be an acute angle, but such angle $\theta$ may be selected within 180° and the intermediate fiber plate may take a shape corresponding to the selected angle. The angle $\theta$ is determined by a resolution with which the photo-information is applied to the surface of the photosensitive medium.

The conditions of the contact between the photo-information outlet face of the optical fiber tube and the photo-information inlet face of the intermediate optical fiber plate will now be discussed. The contact may be such that a slight clearance is left between the two faces, but if filled with transparent liquid of good lubricating property, such clearance could result in a better sliding effect between the two fiber plates.

Where such liquid is interposed, care must be taken so that the light from the fiber plate of the optical fiber tube may not be decreased in the contact are due to diffusion, reflection and the like. For this purpose, the refractive index of the liquid must be taken into account. It is also necessary that the liquid be hermetically sealed so as to prevent entry of air or dust thereinto or to prevent vaporization and dry-up of the liquid.

The refraction and reflection of light in the contact area will now be considered more particularly. With regard to the refraction, a liquid of higher refractive index such as oil for immersion, silicon oil or the like should desirably be employed to prevent or minimize the diffusion of light in the area between the two fiber plates. Also, to minimize the reflection of light in the overlapped portion, the refractive index of the liquid should be selected to a value equal to that of the cores of the fiber plates. These are the desirable conditions for the refraction and reflection in the area between the two fiber plates, and such refractive index of the liquid may be determined by various factors of the inventive photo-information transmission and exposure device as applied to an electrophotographic copying apparatus, such as the optical resolution, the brightness of the optical fiber tube, the sensitivity of the photosensitive medium, etc.

Description will now be made of the influences arising from the overlap between the fiber plate secured to the optical fiber tube and the intermediate fiber plate.

Figure 4:
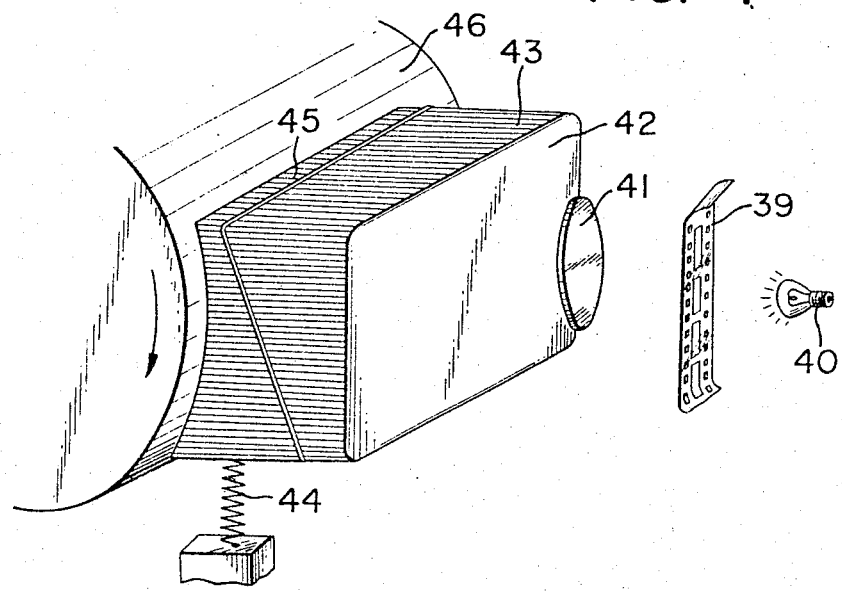
Figure 5:
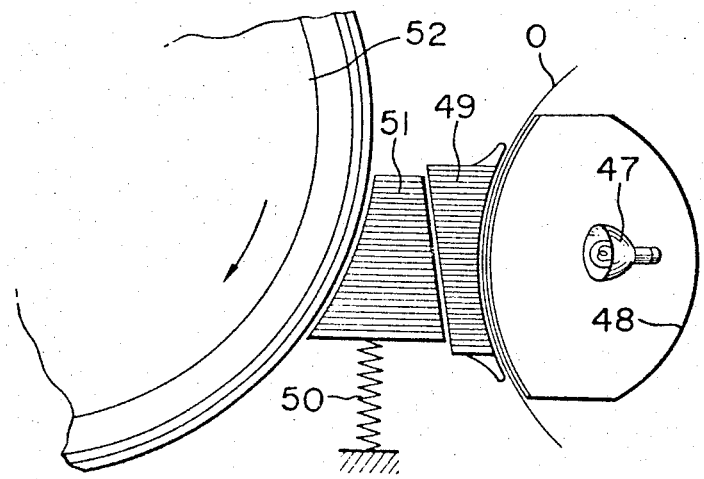

One of such influences is a reduction in resolution. Generally, for two overlapped fiber plates, the resolution may be expressed by $W_1 W_2 / \sqrt{W_1^2 + W_2^2}$, where $W_1$ and $W_2$ represent the resolution (lines/mm) of the respective fiber plates. Thus, a reduction in resolution unavoidably results from the overlap of two fiber plates, but this may be overcome by selecting the diameters of the cores of the fiber plates through calculating back the foregoing formula so as to satisfy the resolution of the projected image finally provided on the surface of the photosensitive medium. Further, if the overlapped fiber plates have their optical axes disposed at an angle with respect to each other, the numerical apertures of the fiber plates will be varied so that the light condensed or emitted thereby will have a directivity. Therefore, where the optical axes of the two fiber plates are at an angle with respect to each other as shown in FIGS. 4 and 5, such variation in the condensing power resulting from he directivity of light must be taken into account and the angle between the optical axes cannot be selected to a great value. When the device is applied to an electrophotographic copying apparatus, the angle between the optical axes will be selected within a range which will satisfy a required optical resolution.

Some specific embodiments of the present invention will now be described in detail with reference to the drawings.

Figure 2:
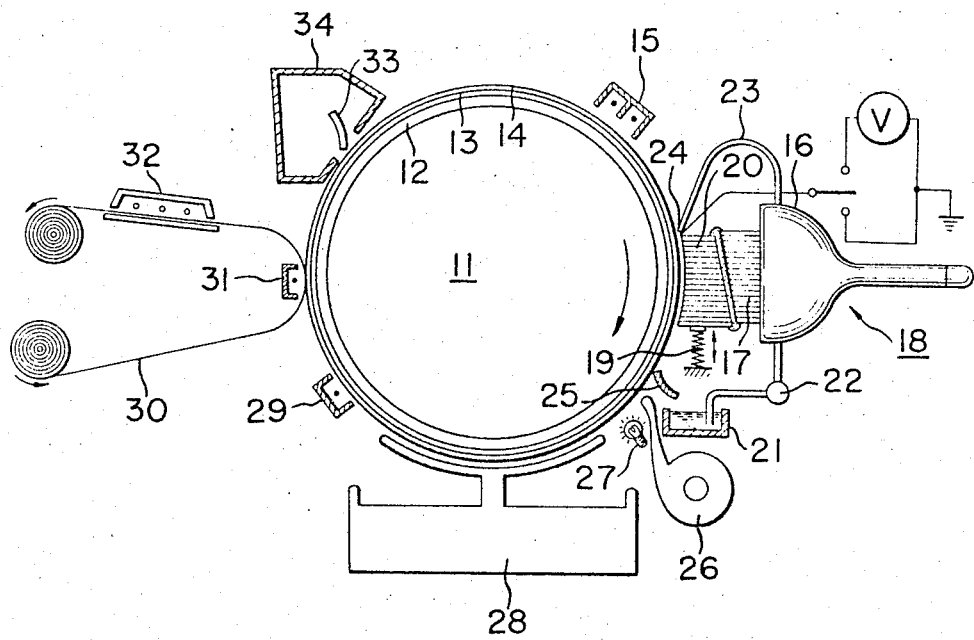
FIG. 2 schematically illustrates the general arrangement of an electrophotographic copying apparatus to which the photo-information transmission and exposure device of the present invention is applied.

FIG. 2 illustrates the photo-information transmission and exposure device of the present invention as applied to an electrophotographic copying apparatus. Numeral 11 generally designates a drum rotatable in the direction of arrow and supporting therearound a photosensitive medium comprising successive laminated layers, i.e., a conductive back-up member 12, a photoconductive layer 13 and an insulative layer 14. The rotatable drum may be replaced by an endless belt or other means. The photosensitive medium is first charged uniformly over the entire surface thereof by a charger 15, whereafter the photosensitive medium is exposed to the photo-information transmitted from an optical fiber tube 18 through an intermediate optical fiber plate 20 which is movable up and down by a spring 19, the optical fiber tube 18 comprising a cathode ray tube 16 and an optical fiber plate 17 secured thereto. Between the optical fiber plate 17 and the movable intermediate fiber plate 20 is interposed an amount of lubricant liquid $L_1$ to provide smooth sliding movement of the intermediate fibe plate. On the other hand, an amount of discharging or charging liquid $L_2$ is supplied from a liquid storage and collection reservoir 21 into the clearance between the photosensitive drum and the intermediate fiber plate by a pump 22 and through a liquid supply pipe 23, and a suitable voltage (including a grounded voltage) is applied to the liquid $L_2$, whereby the photo-information transmission and exposure is effected simultaneously with or immediately before the simultaneous application of image light and discharge or charge. The liquid thus used for the discharging or charging is then removed from the surface of the photosensitive medium by a doctor blade 25. The application of a suitable voltage to the discharging or charging liquid may be accomplished by applying the voltage to a conductive thin layer provided on the face of the intermediate fiber plate which confronts the photosensitive drum, or by applying the voltage to the liquid removing doctor blade pre-treated for conductivity, or by applying the voltage to an electrode separately provided for such purpose. Further, the discharging or charging liquid may be common with the said lubricant liquid. After the discharging or charging liquid has thus been removed by the blade, the surface of the photosensitive medium may be dried by blast drier maeans 26, if required, and then it is subjected to an overall exposure by an overall exposure device 27 and thereafter enters a developing process. The development is shown to be accomplished by a liquid developing device 28, but it will be apparent that a dry type development using a magnetic brush, a fur brush or the like may also be adopted. The photosensitive medium so developed is further rotated so that any residual developing liquid thereon is squeezed away by a squeeze charger designated as at 29. The liquid thus squeezed away may be either collected for reuse in the developing device 28 or discharged outwardly of the apparatus. Where a dry type development is adopted, the squeeze charger is used as a post-charger for enhancing the transfer efficiency of the developing toner. The photosensitive medium with the image so visualized reaches a transfer station, where it is contacted by a transfer medium 30 moved in the direction of arrow and the image is transferred to the transfer medium with the aid of a transfer corona charger 31. The toner thus transferred is fixed on the transfer medium by a fixing device 32 using heat or the like. After the image transfer has been completed, the photosensitive medium is cleaned for reuse by a cleaning dvice 34 provided with a cleaning blade 33. In this way, the information from the cathode ray tube 16 is copied on the transfer medium.

Figure 3:
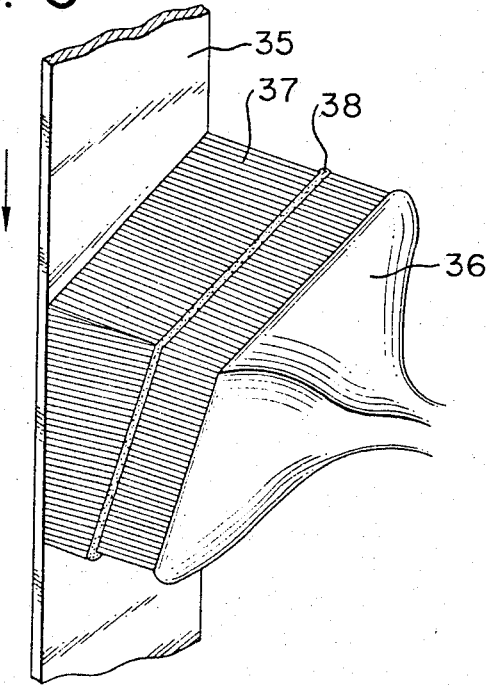
FIGS. 3, 4 and 5 are perspective views showing further embodiments of the present invention.

FIG. 3 illustrates another embodiment of the present invention in which a flat photosensitive sheet 35 linearly movable in the direction of arrow is exposed to the photo-information from an optical fiber tube 36 with a movable intermediate optical fiber plate 37 brought into intimate contact with the photosensitive sheet. In the present embodiment, the movable intermediate optical fiber plate is always fitted between the photosensitive sheet and the optical fiber tube with the aid of its own gravity and of the movement of the photosensitive sheet, and is movable up and down in accordance with the variation in the distance between the photosensitive sheet and the optical fiber tube to thereby maintain the intimate contact for exposure. Since the photosensitive sheet forms a flat plane, the photo-information outlet face of the intermediate optical fiber plate forms a complementary flat plane. Numeral 38 designates an amount of lubricant liquid for enhancing the relative sliding movement of the optical fiber tube and the movable intermediate optical fiber plate.

Figure 1B:
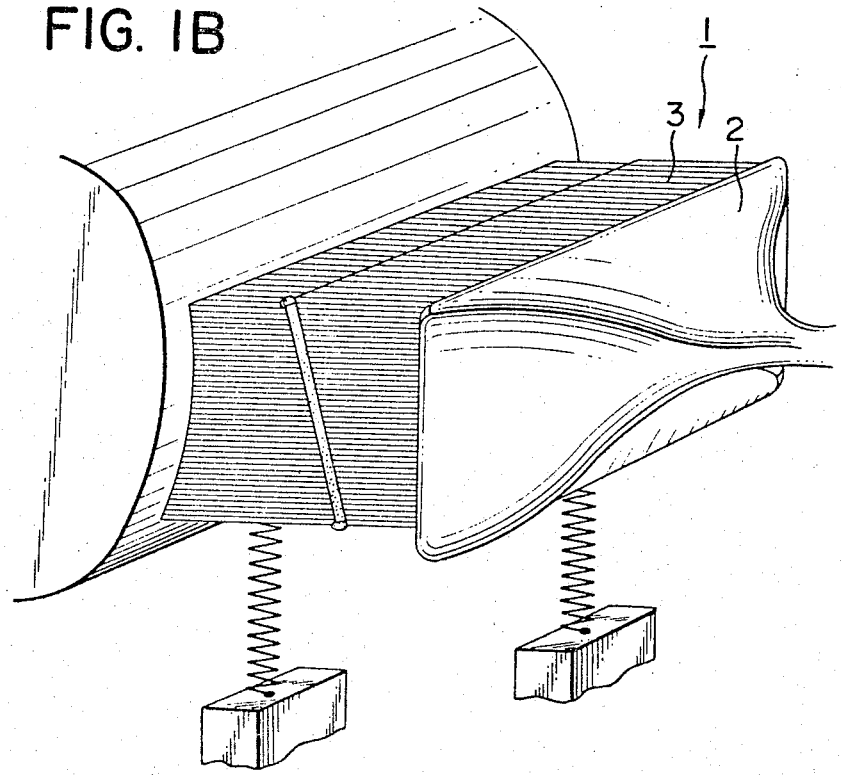
FIG. 1(B) is a persepctive view corresponding to FIG. 1(A).

FIG. 4 shows a further embodiment of the present invention in which an image on a microfilm, instead of the image from the optical fiber tube forming the photo-information source in the embodiment of FIG. 1, may be projected on a projection screen 42 by a lamp 40 and through a projection lens 41. The image formed on the proejction screen 42 may be transmitted through a fixed optical fiber plate 43 and further through a movable intermediate optical fiber plate 45 biased upwardly by a spring 44 and finally onto a photosensitive medium 46 which is in intimate contact with the plate 45, whereby the photosensitive medium is exposed to the image from the microfilm.

FIG. 5 illustrates still a further embodiment of the present invention in which an image from a photo-information source in the form of a curved sheet original 0 may be projected by a light source 47 and a reflector 48 to pass through a fixed optical iber plate 49 and further through an intermediate optical fiber plate 51 biased upwardly by a spring 50, so as to impinge on the surface of a photosensitive drum 52 which is in intimate contact with the intermediate fiber plate. In this embodiment, the photo-information inlet face of the fixed optical fiber plate 49 is formed with a curvature complementary to that of the curved sheet original.

Figure 6:
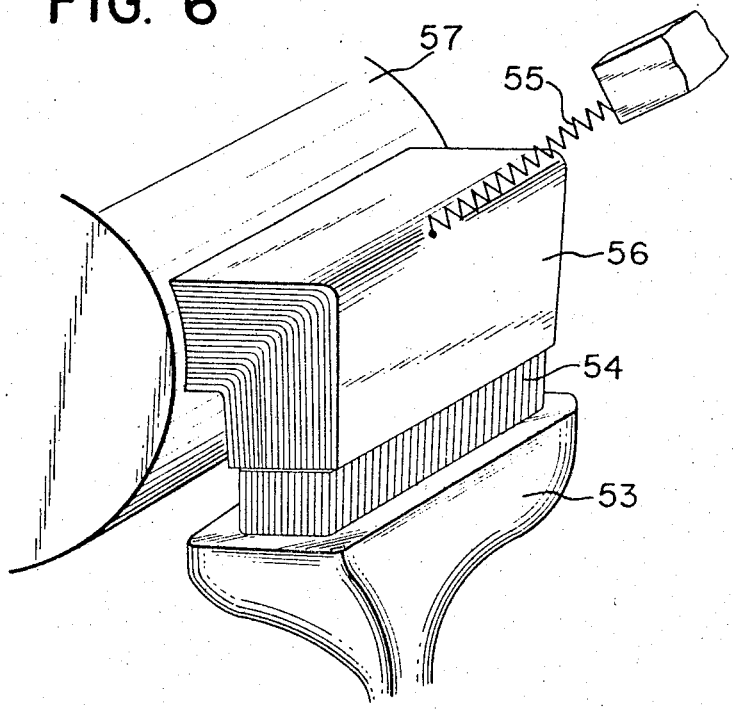
FIGS. 6 and 7 show modified forms of the present invention.
Figure 7:
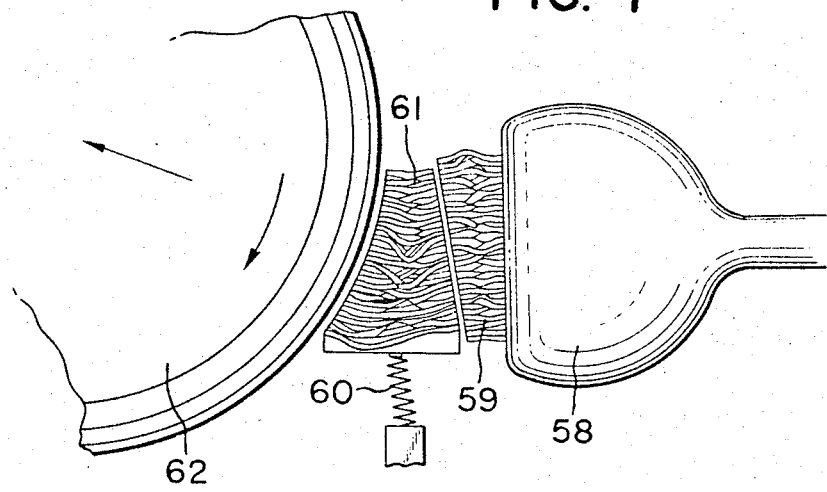

FIGS. 6 and 7 show modifications of the embodiments of FIGS. 1 to 5. In those previous embodiments, the photo-information inlet and outlet faces of the optical plate are severed obliquely with respect to the direction of the optical fibers in accordance with the mode of embodiment, and this would result in a great loss of light and definition when the photo-information enters and leaves the optical fiber plate. The present modifications overcome these disadvantages by severing the photo-information inlet and outlet faces perpendicularly to the direction of the optical fibers. More specifically, in FIG. 6, this is achieved by bending a bundle of optical fibers substantially at a right angle, and in FIG. 7, the photo-information inlet and outlet faces of the fixed optical fiber bundle and those of the movable intermediate optical fiber bundle are all severed perpendicularly to the direction of the fibers and the individual fibers at each severed ends are secured together with the intermediate portion of each optical fiber bundle being loosened so as to orient the photo-information inlet and outlet faces of each optical fiber bundle in desired directions. In FIGS. 6 and 7, numeral 53 and 58 designate the respective optical fiber tubes, numeral 54 and 59 the respective fixed optical fiber bundles, numerals 55 and 60 the springs for biasing the respective intermediate optical fiber bundles 56 and 61, and numerals 57 and 62 the respective photosensitive drums rotatable in the direction of arrow.

As has been shown and described hitherto, the photo-information transmission and exposure device of the present invention employs an optical fiber bundle as a photo-information transmission member fixed to the fluorescent face of a cathode ray tube or to the projection screen for microfilm or the like, and a movable intermediate optical fiber bundle for absorbing any variation in the distance between the surface of a photosensitive medium and the photo-information outlet face of the optical fiber bundle when the photo-information is being transmitted to the photosensitive medium for the purpose of exposure. Moreover, the configuration of the intermediate optical fiber bundle may be variously changed to thereby change the position of the photo-information source such as cathode ray tube or the like with respect to the photosensitive medium, and this contributes to an effective utilization of the space in an electrophotographic copying apparatus to which the device is applied, and accordingly contributes to a reduction in the size of such apparatus.

The foregoing specific embodiments of the present invention have been illustrated as being applicable to a particular electrophotographic system and particular forms of photo-information source, whereas these are not the only possible applications but the present invention is of course applicable to any of the known various electrophotographic systems. Further, the device of the present invention can be used as a device for applying photo-information to the surface of a photosensitive medium and discharging such surface simultaneously, and is also usable as a device simply for effecting exposure to photo-information.

I claim:

1. A photo-information transmission and exposure device comprising:
    a photosensitive medium;
    a photo-information source;
    a first photo-transmission member disposed in intimate contact with said photo-information source to transmit photo-information therefrom; and
    a second movable photo-transmission member disposed so as to transmit the photo-information passed through said first photo-transmission member to said photosensitive medium to expose the latter to said photo-information and to absorb and adjust the distance change between said photosensitive medium and said first photo-transmission member, said second photo-transmission member having a photo-information inlet face opposed to the photo-information outlet face of said first photo-transmission member and a photo-information outlet face opposed to the surface of said photosensitive medium,
    the angle formed between te tangential line at the center of the surface of the said photosensitive medium opposed to said second photo-transmission member and the tangential line at the center of the surface of said first photo-transmission member opposed to said second photo-transmission member being within 180°, and the angle between the tangential line at the center of the photo-information inlet and outlet faces of said second photo-transmission member being equal to said first-named angle.

2. A device according to claim 1, wherein said first and second photo-transmission members are otpical fiber plates.

3. A device according to claim 1, wherein said first and second photo-transmission members are optical fiber bundles whose photo-information inlet and outlet faces have cross-sections perpendicular to the direction of the optical fibers.

4. A device according to claim 1, wherein said photosensitive medium forms a flat plane and the photo-information outlet face of said second photo-transmission member forms a flat plane.

5. A device according to claim 1, wherein the surface of said photosensitive medium forms a curved plane and the photo-information outlet face of said second photo-transmission member froms a curved plane complementary to said curved surface of said photosensitive medium.

6. A device according to clai 1, wherein said photo-information source is a cathode ray tube.

7. A device according to claim 1, wherein said photo-information source is a microfilm projector.

8. A device according to claim 1, wherein transparent lubricant liquid is interposed between said first and said second photo-transmission member.

9. A device according to claim 1, further comprising means for normally urging said second photo-transmission member against the surface of said photosensitive medium and against said first photo-transmission member.

10. A device according to claim 9, wherein said urge means is a spring.

11. A device according to claim 9, wherein said urge means is the gravity of said second photo-transmission member.

12. A device according to claim 9, wherein said urge means is provided by displacement of said photosensitive medium.

13. A device according to claim 2, wherein transparent lubricant liquid is interposed between said first and said second optical fiber plate.

14. A device according to claim 13, wherein said transparent lubricant liquid has a refractive index approximate to that of the cores of said two optical fiber plates.

15. A device according to claim 3, wherein transparent lubricant liquid is interposed between said first and said second optical fiber bundle.

16. A device according to claim 15, wherein said transparent lubricant liquid has a refractive index approximate to that of the cores of said two optical fiber bundles.

17. A photo-information transmission and exposure device comprising:
    a photosensitive medium;
    a photo-information source;
    a first photo-transmission member disposed in intimate contact with said photo-information source to transmit photo-information therefrom;
    a second movable photo-transmission member disposed so as to transmit the photo-information passed through said first photo-transmission member to said photosensitive medium to expose the latter to said photo-information, said second photo-transmission member having a photo-information inlet face opposed to the photo-information outlet face of said first photo-transmission member and a photo-information outlet face opposed to the surface of said photosensitive medium;
    means for supplying discharging or charging liquid into the clearance between said photosensitive medium and said second photo-transmission member; and
    means for applying a desired potential (including a grounded potential) to said supplied liquid to discharge or charge said liquid.

18. A device according to claim 17, wherein lubricant liquid is interposed between said first and second photo-transmission members, and said lubricant liquid is common with said discharging or charging liquid.

* * * * *

UNITED STATES PATENT OFFICE
CERTIFICATE OF CORRECTION

Patent No. 3,834,803      Dated September 10, 1974

Inventor(s) SYUSEI TSUKADA

It is certified that error appears in the above-identified patent and that said Letters Patent are hereby corrected as shown below:

Column 3, line 32, "any" should read --and--;

Column 4, line 14, "persepctive" should read --perspective--;

Column 4, line 36, "phto" should read --photo--;

Column 6, line 16, "resoltuion" should read --resolution--;

Column 6, line 30, "he" should read --the--;

Column 7, line 17, "maeans" should read --means--;

Column 7, line 41, "dvice" should read --device--;

Column 8, line 4, "proejction" should read --projection--;

Column 8, line 15, "iber" should read --fiber--;

Column 9, line 37, "te" should read --the--;

Column 10, line 1, "clai" should read --claim--;

In the heading please insert:

--Foreign Application Priority Data

April 5, 1972    Japan .............. 34155/1972 --.

Signed and sealed this 17th day of December 1974.

(SEAL)
Attest:

McCOY M. GIBSON JR.          C. MARSHALL DANN
Attesting Officer              Commissioner of Patents